US007685070B2

(12) United States Patent
Abu-Amara et al.

(10) Patent No.: US 7,685,070 B2
(45) Date of Patent: Mar. 23, 2010

(54) METHOD AND SYSTEM FOR USING ENTERTAINMENT FILES AS RING TONES

(75) Inventors: Hosame H. Abu-Amara, Round Lake, IL (US); Senaka Balasuriya, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 796 days.

(21) Appl. No.: 11/461,864

(22) Filed: Aug. 2, 2006

(65) Prior Publication Data

US 2008/0034220 A1 Feb. 7, 2008

(51) Int. Cl.
*G06F 21/00* (2006.01)

(52) U.S. Cl. ............................ 705/51; 705/50; 705/57; 455/567; 455/414.1; 455/412.1; 455/417; 455/414.4; 380/200; 380/277; 713/156

(58) Field of Classification Search ............ 705/50-79; 455/567, 412.1
See application file for complete search history.

(56) References Cited

U.S. PATENT DOCUMENTS

| | | | | |
|---|---|---|---|---|
| 5,699,428 | A * | 12/1997 | McDonnal et al. | 713/165 |
| 6,212,097 | B1 * | 4/2001 | Kihara et al. | 365/185.04 |
| 6,947,728 | B2 * | 9/2005 | Tagawa et al. | 455/414.1 |
| 6,985,591 | B2 * | 1/2006 | Graunke | 380/277 |
| 7,260,421 | B2 * | 8/2007 | Harris | 455/567 |
| 2004/0032946 | A1 | 2/2004 | Koser et al. | |
| 2004/0092295 | A1 | 5/2004 | Yamada | |
| 2004/0131175 | A1 | 7/2004 | Rogalski et al. | |
| 2005/0034153 | A1 * | 2/2005 | Abramson et al. | 725/32 |
| 2005/0036603 | A1 | 2/2005 | Hughes | |
| 2005/0172154 | A1 * | 8/2005 | Short et al. | 713/201 |
| 2006/0015649 | A1 | 1/2006 | Zutaut et al. | |
| 2006/0079295 | A1 | 4/2006 | Chan | |
| 2006/0259434 | A1 * | 11/2006 | Vilcauskas et al. | 705/57 |
| 2006/0293089 | A1 * | 12/2006 | Herberger et al. | 455/567 |
| 2007/0112580 | A1 * | 5/2007 | Tang-Talpin et al. | 705/1 |
| 2007/0112977 | A1 * | 5/2007 | Hornal et al. | 709/246 |
| 2007/0117554 | A1 * | 5/2007 | Arnos | 455/414.4 |

OTHER PUBLICATIONS

Morris Dworkin, Recommendation for Block Cipher Modes of Operation, NIST Special Publication 800-38A, Dec. 2001, pp. 1-66, National Institute of Standards and Technology, Gaithersburg, Maryland, USA.

* cited by examiner

*Primary Examiner*—Andrew J. Fischer
*Assistant Examiner*—Mamon Obeid
(74) *Attorney, Agent, or Firm*—Sylvia Chen

(57) ABSTRACT

A method and system, suitable for using an original entertainment file for playing as a ring tone on a communication device (104), is provided. The method includes decrypting (304) a part of the original entertainment file using an authorization key upon receiving an incoming call signal. The part of the original entertainment file is played (306) until the incoming call signal is acknowledged. The method further includes decrypting (308) a remaining part of the original entertainment file using the authorization key after the incoming call signal is acknowledged. The remaining part of the original entertainment file is then encrypted (310) using a local authorization key to form a second entertainment file. The second entertainment file is then stored (312) in the communication device.

6 Claims, 4 Drawing Sheets

METHOD AND SYSTEM FOR USING ENTERTAINMENT FILES AS RING TONES

FIELD OF THE INVENTION

This invention relates generally to communication devices, and more specifically, to the usage of entertainment files as ring tones.

BACKGROUND OF THE INVENTION

Communication devices are widely used as entertainment units through various value-added services. For example, users can download audio and video files, as well as other entertainment files, to their communication devices from the Internet. To restrict access to these entertainment files, Digital Rights Management (DRM) is gaining wide popularity. DRM ensures that only users with valid permissions are able to access protected entertainment files. Typically, users can access protected entertainment files by paying for them. One application of entertainment files is their use as ring tones. Users can periodically change their selected ring tones to, for example, distinguish callers or simply for variety.

There are various existing techniques for playing protected entertainment files as ring tones on communication devices. However, existing techniques involve multilevel authentication of entertainment files, which causes processing delays and inefficient operation. Moreover, by using these existing techniques, users cannot play a DRM protected entertainment file both as a ring tone as well as music unless they purchase one version of the entertainment content for use as a ring tone and another version of the entertainment content for use as music.

BRIEF DESCRIPTION OF THE FIGURES

The present invention is illustrated by way of example and not limitation in the accompanying figures, in which like references indicate similar elements, and in which.

Figure 1:
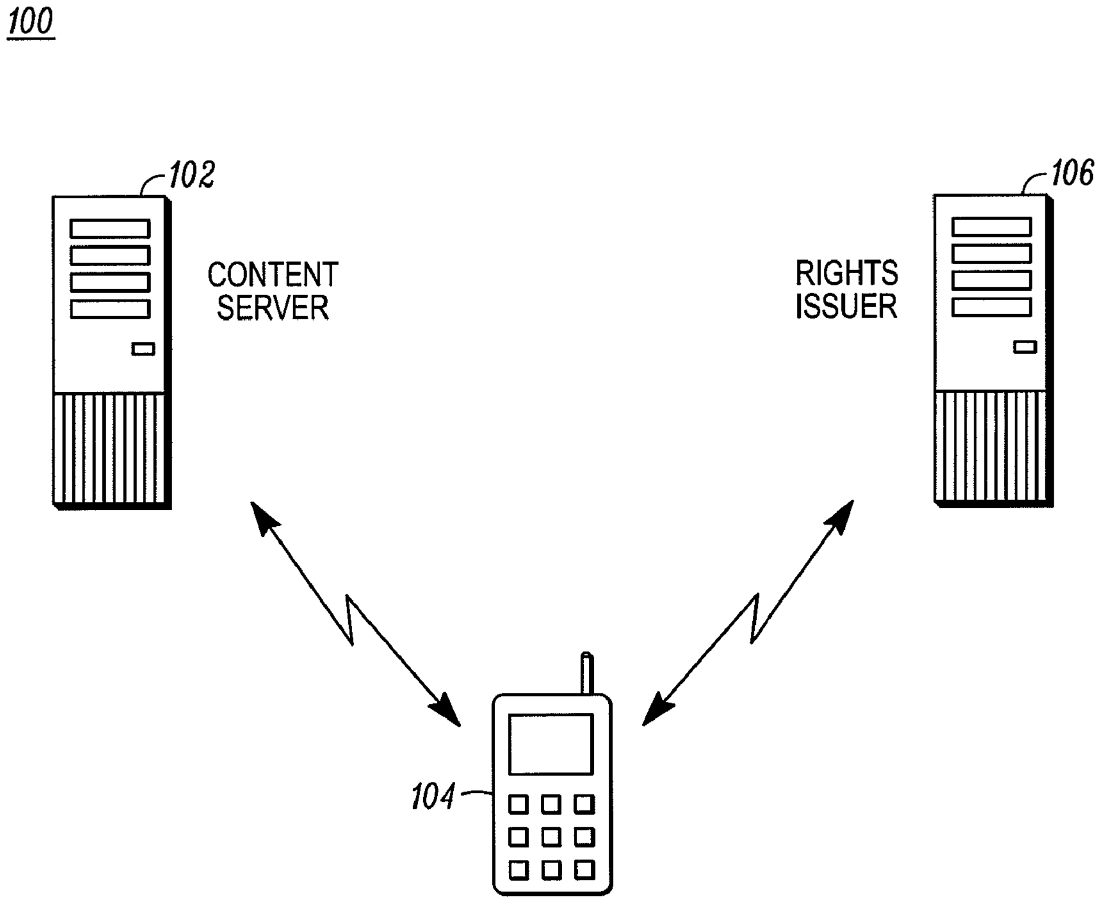
FIG. 1 is a block diagram illustrating an environment where various embodiments of the present invention can be practiced.

Skilled artisans will appreciate that elements in the figures are illustrated for simplicity and clarity and have not necessarily been drawn to scale. For example, the dimensions of some of the elements in the figures may be exaggerated relative to other elements, to help to improve an understanding of embodiments of the present invention.

DETAILED DESCRIPTION

Before describing in detail a particular method and system for using entertainment files as ring tones in a communication device in accordance with various embodiments of the present invention, it should be observed that the present invention resides primarily in combinations of method steps and apparatus components related to a communication device capable of playing entertainment files. Accordingly, the apparatus components have been represented where appropriate by conventional symbols in the drawings, showing only those specific details that are pertinent for understanding the present invention, so as not to obscure the disclosure with details that will be readily apparent to those of ordinary skill in the art, having the benefit of the description herein.

In accordance with an embodiment of the present invention, a method for using an original entertainment file as a ring tone on a communication device is disclosed. Ring tones can be triggered by incoming audio calls, incoming data calls, incoming push-to-talk calls, and the like. The method includes decrypting a part of the original entertainment file using an authorization key upon receiving an incoming call signal. The part of the original entertainment file is played until the incoming call signal is acknowledged. The method further includes decrypting a remaining part of the original entertainment file using the authorization key after the incoming call signal is acknowledged. The remaining part of the original entertainment file is then encrypted using a local authorization key to form a second entertainment file. The second entertainment file is then stored in the communication device.

In accordance with another embodiment, another method for using an original entertainment file as a ring tone on a communication device is disclosed. The method includes selecting portions of the original entertainment file to be used as ring tones. The portions are decrypted using an authorization key. The portions are encrypted using a local authorization key and then stored in the communication device. The method further includes decrypting an appropriate portion of the portions of the original entertainment file upon receiving an incoming call signal. The appropriate portion is played as the ring tone.

In accordance with another embodiment, a communication device for playing an original entertainment file as a ring tone is disclosed. The communication device includes a memory unit, a processor, and a media player. The memory unit stores the original entertainment file. The processor is operatively coupled to the memory unit and decrypts a part of the original entertainment file with a first authorization key upon receiving an incoming call signal. The media player is operatively coupled to the processor to play the part of the original entertainment file as a ring tone until the incoming call is acknowledged. After the incoming call is acknowledged, the processor locally encrypts the remaining part of the original entertainment file with a local authorization key to form a second entertainment file. The processor stores the second entertainment file in the memory unit. Further, the processor decrypts the second entertainment file, and the media player plays the second entertainment file as a ring tone upon receiving a subsequent incoming call signal.

FIG. 1 shows an environment 100 where various embodiments of the present invention can be practiced. The environment 100 includes a content server 102, a communication device 104, and a rights issuer 106. For the purpose of this description, only one communication device is shown in FIG. 1. However, any number of communication devices can connect to the content server 102. Examples of the communication device 104 include, but are not limited to, a mobile device, a pager, a laptop computer, and a Personal Digital Assistant (PDA). A user of the communication device 104 can download an original entertainment file from the content server 102 to use as a ring tone. The user can use the original entertainment file as an audio ring tone or a video ring tone. A ring tone is triggered by an incoming call signal, such as for an incoming audio call, an incoming data call, an incoming push-to-talk call, and the like. The user can also use the original entertainment file in a non-ring tone manner, such as for relaxation or entertainment. Examples of the entertainment file include, but are not limited to, audio files, video files, and audio-visual files. The content server 102 transmits the original entertainment file data to the communication device 104 through a wireless and/or wire-line network. The wireless network can be an Ultra Wide Band (UWB) network, a Wi-Fi network, a Bluetooth network, an Infrared (IR) network, a Home RF network, a Wireless Local Area Network (WLAN), a Wireless Wide Area Network (WWAN), combinations of wireless networks, and the like. The wire-line network can be an Ethernet network, a Local Area Network (LAN), a Metropolitan Area Network (MAN), a Wide Area Network (WAN), the Internet, combinations of wire-line and wireless networks, and the like.

The user can also obtain authorization keys to download and play the entertainment file on the communication device 104. The authorization keys are received through the rights issuer 106, for example, by paying the requisite charges. It should be appreciated that the content server 102 and the rights issuer 106 can physically be the same server. In an embodiment of the invention, the entertainment files available at the content server 102 are protected by Digital Rights Management (DRM). DRM is a generic term that refers to any of several techniques for restricting access to an entertainment file. Most Internet music stores employ DRM to restrict usage of music purchased and downloaded online. In a typical implementation of DRM, entertainment files are encrypted by using asymmetric keys. An example of an asymmetric key is the public and private key pair used in RSA encryption. The entertainment files can be decrypted and played using a decryption key obtained from a rights issuing authority. DRM can control file access, such as the number and length of replays, alerting, sharing, copying, saving, and the like. The method and system for using entertainment files as ring tones contemplates using standard DRM protected entertainment files as ring tones and also allows the standard DRM protected entertainment files to be used as entertainment.

Figure 2:
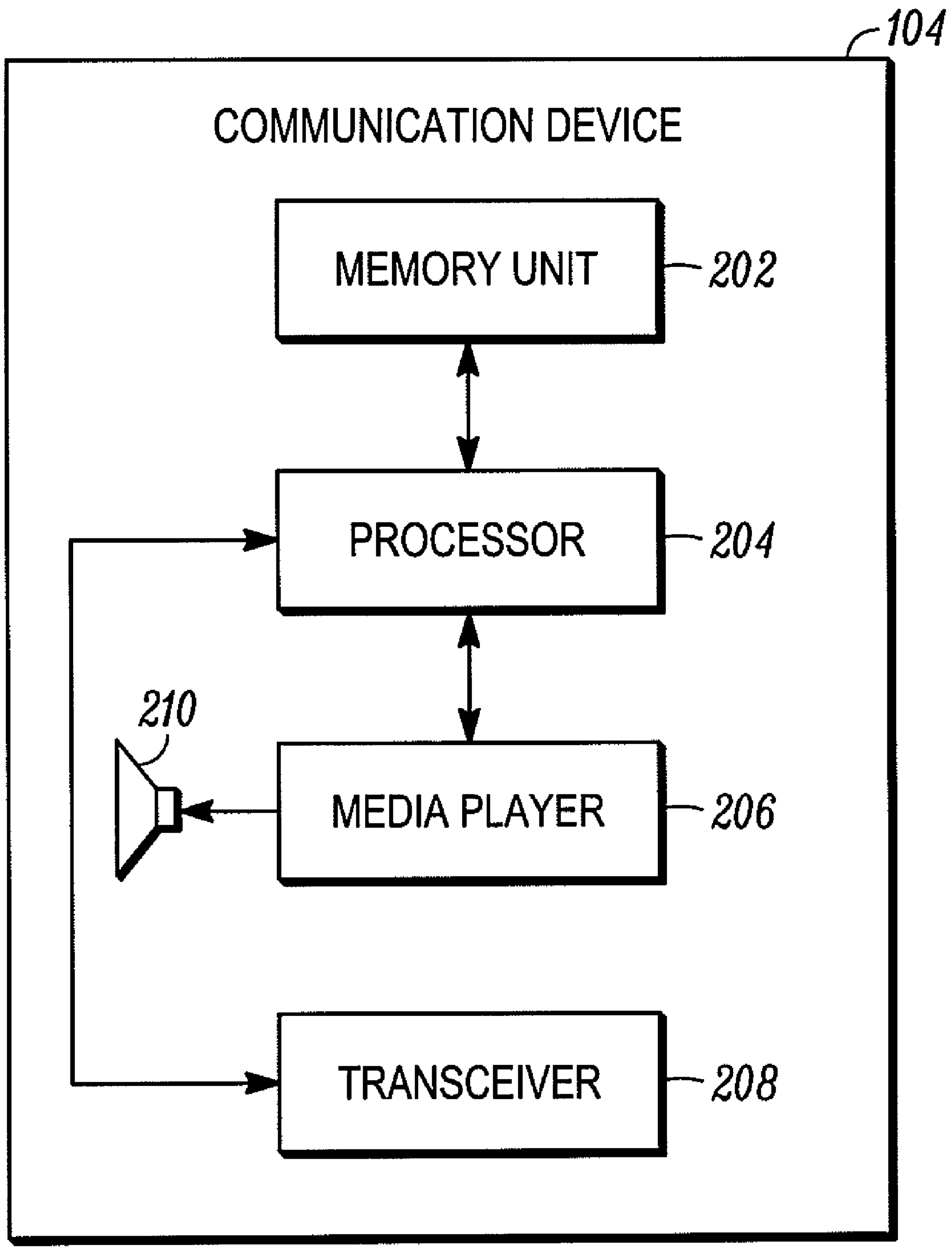
FIG. 2 is a block diagram of a communication device, in accordance with an embodiment.

FIG. 2 is a block diagram illustrating the communication device 104, in accordance with an embodiment. The communication device 104 includes a memory unit 202, a processor 204, and a media player 206. The communication device 104 also includes a transceiver 208 for receiving the entertainment files from the content server 102. The transceiver 208 is operatively coupled with the memory unit 202 through the processor 204. In an embodiment, the processor 204 stores the entertainment files received through the transceiver 208 in the memory unit 202. The memory unit 202 is capable of storing entertainment files in a variety of media formats. Examples of the memory unit 202 include, but are not limited to, a Random Access Memory (RAM), an erasable programmable read-only memory (EPROM), a flash memory, or any other memory for storing files. Examples of formats for the entertainment files to be used as ring tones include, but are not limited to, Moving Pictures Expert Group (MPEG)-1 Layer 3 Audio (MP3), MPEG-1 Layer 2 (MP2), MPEG-N (e.g., MPEG-7), Windows Media Audio (WMA), Windows Media Video (WMV), Windows Media—Advanced Streaming Format (ASF), Windows Audio File (ASX), Musical Instrument Digital Interface (MID), Real Audio (RA), Real Audio/Video (RM), Audio Video Interleaved (AVI), Real Video (RAM), Real Video (RMJ), MPEG-1 Video (MPG), Intel Video Technology (IVF), Vivo Video (VIV), and the like. The original entertainment file is encrypted with an authorization key.

In accordance with an embodiment, upon receiving an incoming call signal, the processor 204 decrypts a part of the original entertainment file with the authorization key, and the media player 206 plays the decrypted part of the original entertainment file. The media player 206 can be implemented as a combination of hardware and software components that render the entertainment file. Therefore, the media player 206 can include a codec for decoding the original entertainment file, rendering circuitry, a speaker 210 for providing audio output, and/or one or more displays (not shown in FIG. 2) for providing video output. For example, when the communication device 104 receives a call or a text message, the processor 204 decrypts a part of an audio file that has been selected by a user of the communication device 104 as a ring tone using an asymmetric authorization key. This decrypted part of the audio file is then played by the media player 206 to alert the user that the communication device 104 has received an incoming call signal.

When the incoming call signal is acknowledged, the processor 204 continues to decrypt the remaining part of the original entertainment file using the authorization key but does not send the decrypted remaining part of the original entertainment file to the audio player 206. Instead, the processor 204 further encrypts the remaining part of the original entertainment file with a local authorization key, to generate a second entertainment file. This decrypting and local encrypting of the remaining part of the original entertainment file can be accomplished in the background while the user is using the communication device 104. For example, when the user of the communication device 104 answers the call, the processor 204 decrypts (using the asymmetric authorization key) and locally encrypts (using a symmetric local authorization key) the remaining part of the audio file and stores it as a second audio file for future ring tone use. Therefore, the processor 204 is capable of identifying the entertainment files transmitted from the content server 102, retrieving them from the memory unit 202, and rendering them to the media player 206 for playing either as a ring tone or as standard entertainment.

Silently decrypting the remaining part of the original entertainment file after an incoming call signal is acknowledged, and then locally encrypting it for use as a ring tone when a subsequent incoming call signal is received, reduces processing delay caused by DRM asymmetric key decryption. Although it depends on the specific implementation, the local encryption can be designed to allow for a faster symmetric key decryption when a subsequent incoming call is received.

Figure 3:
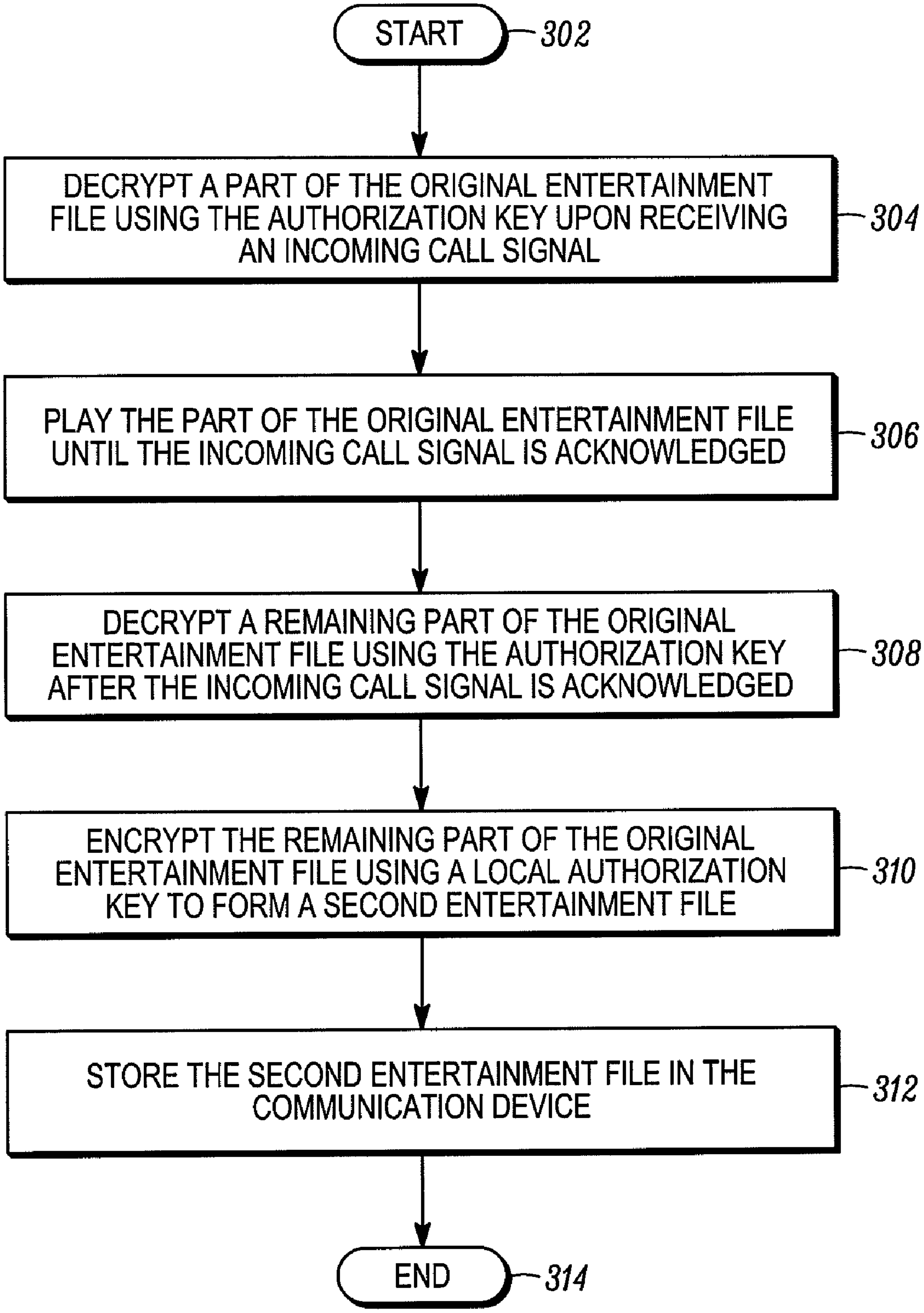
FIG. 3 illustrates a flow diagram of a method for using an entertainment file as a ring tone on a communication device, in accordance with an embodiment.

FIG. 3 illustrates a flow diagram of a method for using an original entertainment file as a ring tone on the communication device 104, in accordance with an embodiment. The method is initiated at step 302. At step 304, a part of the original entertainment file is decrypted by using an authorization key upon receiving an incoming call signal. At step 306, the decrypted part of the original entertainment file is played until the incoming call signal is acknowledged. At step 308, after the incoming call signal is acknowledged, the remaining part of the original entertainment file is decrypted by using the authorization key. This decryption can be done in the background allowing the user to continue using the communication device 104. At step 310, the remaining part of the original entertainment file is encrypted by using a local authorization key to form a second entertainment file. At step 312, the second entertainment file is stored in the memory unit 202 of the communication device 104. The method then terminates at step 314.

In an embodiment, a part of the second entertainment file is decrypted upon receiving a subsequent incoming call signal, and this part of the second entertainment file is played until the subsequent incoming call signal is acknowledged. This decrypting and playing of the second entertainment file can continue in a loop for subsequent incoming call signals. In another embodiment, another part of the original entertainment file is decrypted when the end of the second entertainment file is reached. In other words, the ring tone restarts from the beginning of the original entertainment file when the second entertainment file ends. In another embodiment, a part decrypted from the original entertainment file or the second entertainment file is discarded in case the incoming call signal is not acknowledged. Therefore, in case a user is not present near the communication device 104 when the incoming call signal is received, and therefore, does not hear or see the ring tone, the same ring tone is played on receiving a subsequent incoming call signal.

In an embodiment of the present invention, selected portions are encrypted by using a local authorization key to form one or more additional entertainment files, and these additional entertainment files are stored on the communication device 104. The local authorization key can be a symmetric key. An example for a symmetric key encryption system is the Data Encryption System (DES) or the Advanced Encryption Standard (AES).

In a further embodiment, prior to decrypting the original entertainment file, it is checked whether the original entertainment file is licensed for use as a ring tone. This can be done when the user selects the original entertainment file for use as a ring tone. In case the original entertainment file is not licensed for use as a ring tone, the communication device 104 can obtain a license from the rights issuer 106. Alternately, in case a preview file of the original entertainment file is available, the communication device 104 can use the preview file of the original entertainment file as the ring tone. Typically, a preview file offers some restrictions as compared to entertainment files. Examples of these restrictions include, but are not limited to, a lesser number of allowed replays, a shortened playing duration, and a lower quality.

Figure 4:
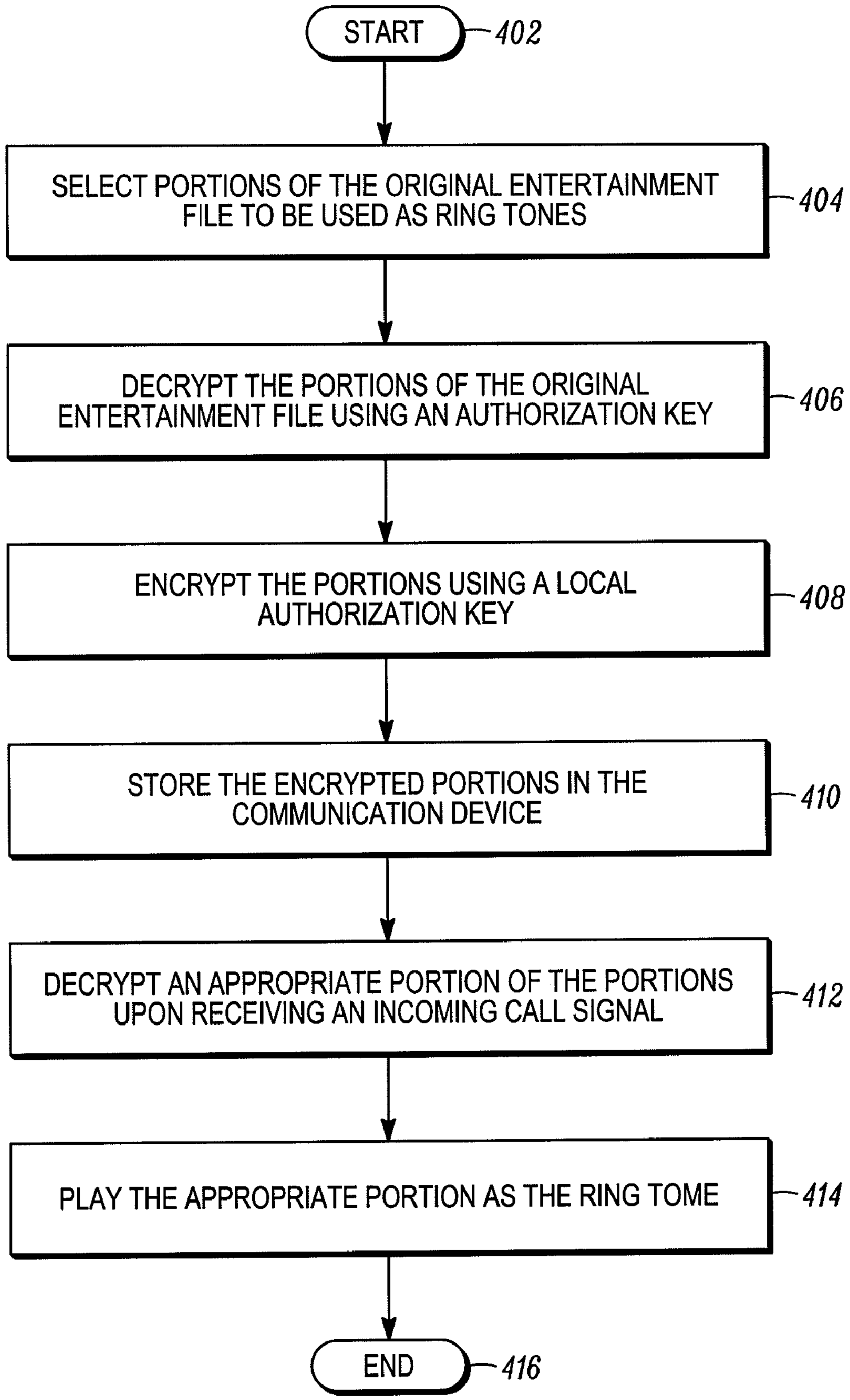
FIG. 4 illustrates a flow diagram of a method for using an entertainment file as a ring tone on a communication device, in accordance with another embodiment.

FIG. 4 illustrates a flow diagram for using an original entertainment file as a ring tone on the communication device 104, in accordance with another embodiment. The method starts at step 402. At step 404, a user selects portions of the original entertainment file to be used as ring tones. The user may choose portions that he/she prefers to be used as ring tones. For example, the user may select portions that have music only, and ignore portions that have lyrics. Alternately, the user may select portions that he/she prefers hearing as a ring tone. The portions can be specified by markers on the original entertainment file to specify start and end of each portion. At step 406, the communication device 104 decrypts the portions of the original entertainment file using an authorization key with which the original entertainment file is encoded. As described above, the authorization key can be an asymmetric key. At step 408, the portions are encrypted using a local authorization key. The local authorization key can be a symmetric key that allows for faster decrypting, as described above. At step 410, the encrypted portions are stored in the communication device 104. At step 412, upon receiving an incoming call signal, the communication device 104 decrypts an appropriate portion from the portions stored in the communication device 104. This appropriate portion is then played as the ring tone to alert the user of the incoming call signal, at step 414. Then the flow ends at step 416.

The appropriate portion can be selected randomly, or based on an expected duration of ringing for the incoming call signal. For example, in case the user of the communication device 104 has set a presence status as 'busy' or 'away', the user would probably not answer an incoming call signal right away. In this case, a portion with a long duration is selected. Similarly, in case the user has been answering previous calls quickly, the communication device 104 can select a portion with a short duration. In another embodiment, the user can associate a designated portion with a caller identification. The caller identification can be stored in a phonebook of the communication device 104. In this embodiment, when an incoming call signal corresponds to the caller information, the communication device 104 selects the designated portion as the appropriate portion.

In a further embodiment, the communication device 104 can check whether the original entertainment file is licensed for use as a ring tone, as described above. In case the original entertainment file is not licensed, the communication device 104 can obtain the license from the rights issuer 106, or use a preview file of the original entertainment file as the ring tone.

Various embodiments of the invention, as described above, provide various advantages. Users can play protected entertainment files (such as music, video, movies, music videos, etc.) as both ring tones and entertainment. Therefore, the users need not pay separately for both uses of the same original entertainment file. The communication device can support many protected entertainment file formats. The present invention also enables users to define and customize ring tones on a communication device efficiently and dynamically. Further, if parts of the entertainment file are locally encrypted on the communication devices with symmetric keys, the processing time needed for decrypting the file can be significantly reduced, as compared to the original entertainment file being decrypted using an asymmetric authorization key whenever an incoming call signal is received.

It will be appreciated that the method and the communication device described herein may include one or more conventional processors and unique stored program instructions that control the one or more processors, to implement, in conjunction with certain non-processor circuits, some of the functions of the electronic device described herein. The non-processor circuits may include, but are not limited to, a radio receiver, a radio transmitter, signal drivers, clock circuits, power source circuits, and user input devices.

In this document, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

It is expected that one of ordinary skill, notwithstanding possible significant effort and many design choices, motivated by, for example, the available time, current technology and economic considerations, when guided by the concepts and principles disclosed herein, will be readily capable of manufacturing a device in accordance with the description, as set out above.

In the foregoing specification, the invention and its benefits and advantages have been described with reference to specific embodiments. However, one of ordinary skill in the art would appreciate that various modifications and changes can be made without departing from the scope of the present invention, as set forth in the claims. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage or solution to occur or become more pronounced are not to be construed as critical, required or essential features or elements of any or all the claims. The invention is defined solely by the appended claims, including any amendments made during the pendency of this application, and all equivalents of the claims, as issued.

What is claimed is:

1. A method of using an original entertainment file as a ring tone on a communication device, wherein the original entertainment file is encrypted with an authorization key, the method comprising:

decrypting a part of the original entertainment file using the authorization key upon receiving an incoming call signal, wherein the incoming call signal is a telephone call signal;

playing the part of the original entertainment file on the communication device until the incoming call signal is acknowledged;

decrypting a remaining part of the original entertainment file using the authorization key after the incoming call signal is acknowledged;

encrypting the remaining part of the original entertainment file using a local authorization key to form a second entertainment file; and storing the second entertainment file in the communication device;

decrypting a part of the second entertainment file upon receiving a subsequent incoming call signal; and playing the part of the second entertainment file on the communication device until the subsequent incoming call signal is acknowledged.

2. The method as recited in claim 1 further comprising:

decrypting another part of the original entertainment file using the authorization key when an end of the second entertainment file is reached; and playing the another part of the original entertainment file.

3. The method as recited in claim 1 further comprising after playing:

discarding the part of the original entertainment file when the incoming call signal is not acknowledged.

4. The method as recited in claim 1 further comprising:

checking whether the original entertainment file is licensed for use as a ring tone.

5. The method as recited in claim 4 further comprising:

obtaining a license to use the entertainment file as a ring tone when the original entertainment file is not licensed for use as a ring tone.

6. The method as recited in claim 4 further comprising:

using a preview of the original entertainment file as a ring tone when the original entertainment file is not licensed for use as a ring tone.

* * * * *